(12) United States Patent
Popek et al.

(10) Patent No.: US 11,664,742 B2
(45) Date of Patent: May 30, 2023

(54) POWER DEVICE HEALTH MONITORING UTILISING A BRIDGE ARRANGEMENT

(71) Applicant: Hamilton Sundstrand Corporation, Charlotte, NC (US)

(72) Inventors: Grzegorz Popek, Birmingham (GB); Stephen Minshull, Bromsgrove (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 360 days.

(21) Appl. No.: 16/985,570

(22) Filed: Aug. 5, 2020

(65) Prior Publication Data
US 2021/0135599 A1 May 6, 2021

(30) Foreign Application Priority Data
Nov. 5, 2019 (EP) .................................... 19275116

(51) Int. Cl.
*H02M 7/5387* (2007.01)
*H02M 1/32* (2007.01)
*H02M 7/219* (2006.01)

(52) U.S. Cl.
CPC ......... *H02M 7/53873* (2013.01); *H02M 1/32* (2013.01); *H02M 1/327* (2021.05); *H02M 7/219* (2013.01)

(58) Field of Classification Search
CPC .......... H02M 1/32; H02M 1/327; H02M 7/02; H02M 7/06; H02M 7/12; H02M 7/155; H02M 7/1555; H02M 7/162; H02M 7/217; H02M 7/219; H02M 7/53873
See application file for complete search history.

(56) References Cited

U.S. PATENT DOCUMENTS

| | | |
|---|---|---|
| 3,671,809 A | 6/1972 | Ryan et al. |
| 6,405,154 B1 | 6/2002 | Ryan |
| 8,355,226 B2 | 1/2013 | Yoshida et al. |
| 9,859,085 B2 | 1/2018 | Rozman et al. |
| 9,862,571 B2 | 1/2018 | Sun et al. |
| 2015/0108930 A1* | 4/2015 | Koller ................... H02M 7/219 318/400.22 |
| 2016/0211786 A1* | 7/2016 | Rozman ................ H02K 19/12 |
| 2019/0334436 A1* | 10/2019 | Lousier ................. C01B 13/115 |
| 2020/0373850 A1* | 11/2020 | Valtysson ............. H02J 50/001 |

FOREIGN PATENT DOCUMENTS

| | | |
|---|---|---|
| DE | 102012208460 A1 | 11/2013 |
| JP | 11289767 A * | 10/1999 |
| JP | H11289767 A | 10/1999 |

OTHER PUBLICATIONS

European Search Report for Application No. 19275116.2, dated May 12, 2020, 24 pages.

* cited by examiner

*Primary Examiner* — Thienvu V Tran
*Assistant Examiner* — Shahzeb K Ahmad
(74) *Attorney, Agent, or Firm* — Cantor Colburn LLP

(57) ABSTRACT

An AC-DC power converter includes a bridge circuit that has a first phase leg with first and second power switches connected to each other in series, a second phase leg with third and fourth power switches connected to each other in series. The first phase leg and the second phase leg are connected to the each other via a bridging connection to form the bridge circuit. The converter also includes means for providing power to said bridge circuit, and means for measuring an output voltage of said bridge circuit.

13 Claims, 4 Drawing Sheets

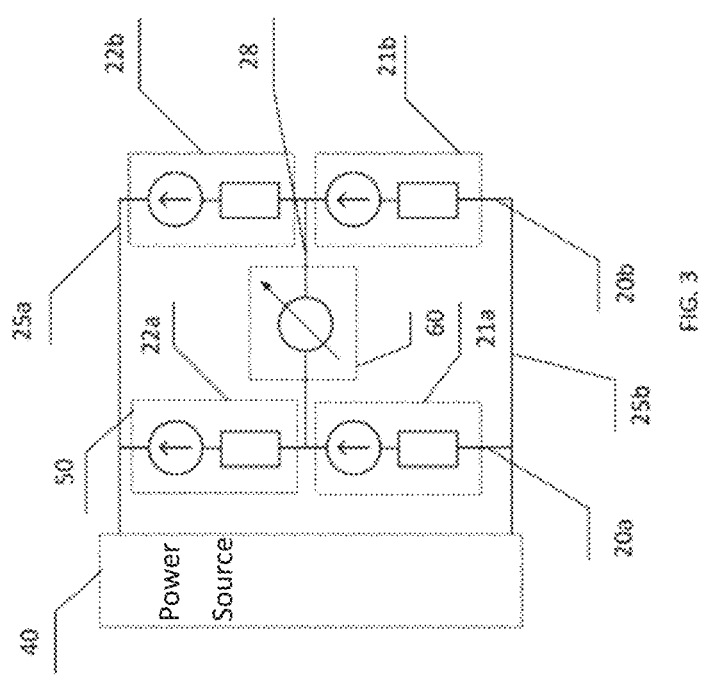

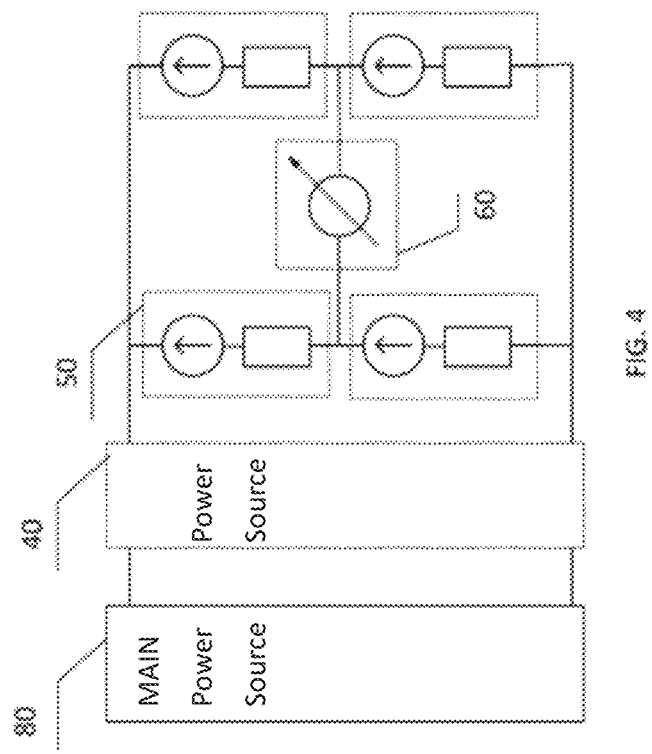

POWER DEVICE HEALTH MONITORING UTILISING A BRIDGE ARRANGEMENT

FOREIGN PRIORITY

This application claims priority to European Patent Application No. 19275116.2 filed Nov. 5, 2019, the entire contents of which is incorporated herein by reference.

FIELD OF TECHNOLOGY

The examples described herein relate to the detection of early device degradation in power devices.

BACKGROUND OF THE INVENTION

Electrical power conversion equipment rely on power semiconductor devices to switch electrical current and block voltage as the basis of their operation. The power devices are generally made using a layered structure of different materials. The bare silicon chip is typically connected to a copper layer using high temperature solder. The copper layer is then electrically insulated with a ceramic substrate layer. The ceramic layer then has a further copper layer which is subsequently connected to a baseplate with another solder layer. The baseplate forms the outer surface of the power device for mechanical fixing to the power conversion equipment chassis. Electrical connections are typically made to the bare silicon chip through aluminium bond wires where multiple bond wires are used in parallel for high power devices.

Since each different material type used within the layered structure exhibits a different rate of thermal expansion, mechanical stresses may be built up within the layered structure over temperature variations. The variations are cyclic as the power converter is turned on and off or as it operates over a power varying duty cycle. The cyclic mechanical stress can then lead to fatigue failures within the layered structure and within the bond wire connections.

The examples described herein therefore aim to provide a means and method for better monitoring the health of a power device and reducing such fatigue failures.

SUMMARY OF THE INVENTION

An AC-DC power converter is described herein comprising a bridge circuit. The bridge circuit comprises a first phase leg that has first and second power switches connected to each other in series and a second phase leg comprising third and fourth power switches connected to each other in series. The bridge circuit is completed by the first phase leg and the second phase leg being connected to the each other via a bridging connection. The convertor also further comprises means for providing power to the bridge circuit and means for measuring an output voltage of the bridge circuit.

In some examples, the means for measuring the output voltage may comprise a balance detector positioned on the bridging connection.

In some examples, the means for measuring the output voltage comprises a balance detector connected via a top-side connection and a low-side connection to the first and second phase legs.

In some examples, the means for measuring an output voltage may be configured to measure line to line voltage.

In some examples, the means for measuring an output voltage may be configured to measure a first voltage or may be further configured to detect a change and/or imbalance between the first voltage and the second voltage, the imbalance indicating a degradation of the health of the power converter.

In some examples, the power source may comprise a pre-charge circuitry of the power converter.

In some examples, the converter may comprise means for providing a warning if a degradation in the health of the converter has been detected.

A method for monitoring the health of an AC-DC power converter is also described herein, the method comprising providing a bridge circuit by forming a first phase leg by connecting first and second power switches to each other in series and forming a second phase leg by connecting third and fourth power switches to each other in series. The bridge circuit is completed by connecting the first phase leg and the second phase leg to each other via a bridging connection. The method further comprises the steps of providing power to the bridge circuit, and measuring a first output voltage of the first phase leg and measuring a second output voltage of the second phase leg. A change or imbalance between the first voltage and the second voltage indicates a degradation in the health of the power converter.

In some examples, the measuring step may comprise comparing the balance of the bridge with reference or historical data about the bridge balance.

In some examples, a change in the bridge balance above a threshold may indicate the degradation in health of the power converter.

In some examples, the step of providing power may comprise providing the power using a pre-charge circuitry of the power converter.

In some examples, the step of providing power may comprise using motor windings to provide a current source.

In some examples, existing DC link voltage measurements may be used to detect the balance across the bridge circuit.

In some examples, the step of measuring the voltage output may be performed as part of a power down sequence, the power down sequence comprising the following steps: removing a main power source from the power switches and providing the power as a secondary power source to the switches.

In some examples, the power may be provided by the secondary power source so that its current is limited.

In some examples, prior to removing the main power source from the power switches, the power down sequence may further comprise heating the power switches subject to testing.

In some examples, the method may include providing a warning if a degradation in health of the power converter has been detected

BRIEF DESCRIPTION OF THE DRAWINGS

FIG. 3 shows a simplified schematic of a new type of power converter that is reconfigured for bridge circuit measurements FIG. 4 shows a simplified schematic of a new type of power converter that is reconfigured for bridge circuit measurements and is connected to a main power source

DETAILED DESCRIPTION OF THE INVENTION

As mentioned in the background section, electrical power converters comprise power semiconductor devices that function to switch electrical current and block voltages. Power semiconductor devices are made using a silicon chip connected to layers of different materials that have different coefficients of thermal expansion. The result of this composition is that mechanical stresses are built up within the layered structure over temperature variations. These variations are cyclic as the power converter is turned on and off, or as the power converter operates over a power varying duty cycle. These cyclic mechanical stresses can lead to fatigue failures within the layered structure of the power device. Fatigue failures can also arise within the multiple bond wire connections on the silicon chip.

The examples described herein provide a new type of converter and method for detecting early device degradation in power conversion equipment. The examples provide an improved means and method for detecting the early onset of the power semiconductor device degradation in a power device that may be caused by thermal or power cycling. This in turn allows for a maintenance action to be scheduled prior to the device failure and subsequent availability loss of the power conversion equipment.

Existing methods to monitor the health of power converters rely on the fact that both delamination and bond wire lift-off cause a change in the power dissipation in the semiconductor device, which is linked to a change in junction temperature. This change can be detected by measuring a power switch output characteristic or by measuring temperature dependent electrical parameters such as gate drive threshold or a change in the dynamic of the switch.

Figure 1:
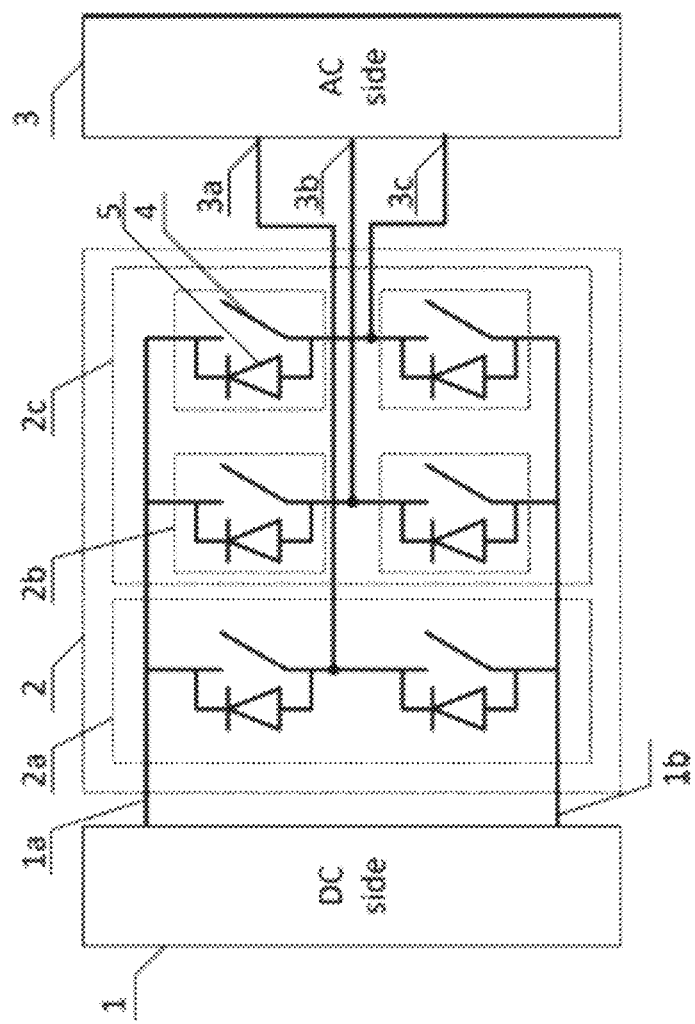
FIG. 1 shows a simplified schematic of a known DC-AC bi-directional power converter

A typical, known, DC-AC power bi-directional power converter is shown in FIG. 1. DC side 1 is connected to the AC side 3 through a bridge inverter circuit 2. Each phase of the AC side 3a, 3b, 3c is connected to a high side 1a and low side 1b via a power switch 2b. In some cases, the power switch 2b comprises a controlled switch 4 and diode 5 arrangement. In other cases the power switch 2b may not include a diode 5, for example if gallium nitride (GaN) high-electron-mobility transistor (HEMT) switches are used. The power switches 2b are arranged in phase legs 2a in the bridge inverter circuit 2.

Figure 2:
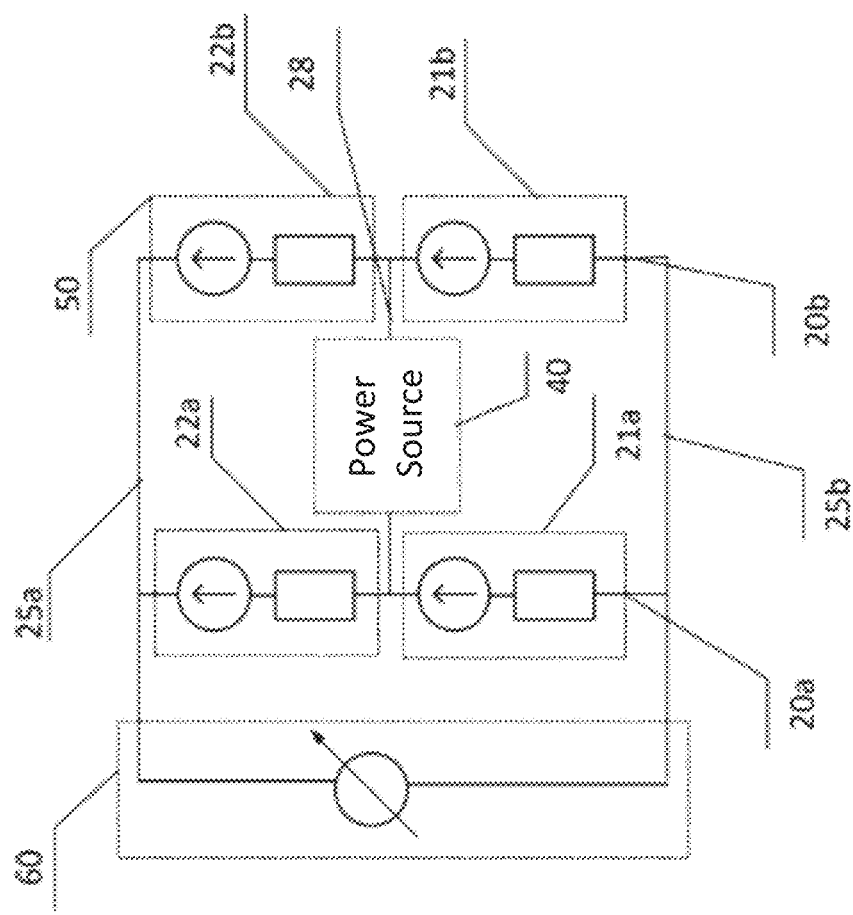
FIG. 2 shows a simplified schematic of a new type of power converter that is reconfigured for bridge circuit measurements

The new examples described herein and shown in FIGS. 2 and 3 relate to the reconfiguration of the power converter into a bridge circuit arrangement in order to perform health monitoring of the power switches. New methods are also described herein for powering down the power converter and for the performance of measurements to determine the health of the power converter.

A new type of power converter that has been reconfigured into a bridge circuit arrangement is shown in FIG. 2. The AC-DC power converter 10 comprises a bridge circuit. A bridge circuit is a topology of electrical circuitry in which two circuit branches (usually in parallel to each other) are bridged by a third branch connected between the first two branches at some intermediate point along them.

The bridge circuit used in these new examples comprises a first phase leg 20a which has first 21a and second 22a power switches connected to each other in series. The bridge circuit also has a second phase leg 20b comprising third 21b and fourth 22b power switches 50 which are also connected to each other in series. The first phase leg 20a and the second phase leg 20b are connected in parallel to each other via the connections 25a, 25b and are further connected to each other via a bridging connection 28 to form the bridge circuit shown in FIG. 2.

These two phase legs 20a, 20b of the power converter as well as the bridging connection 28 are therefore used to form the bridge circuit arrangement. The power switches 21a, 22a, 21b, 22b are presented in FIG. 2 by a resistor in series with a voltage source, however, other types of switches may alternatively be used. The phase legs 20a, 20b of the bridge circuit are connected via the connections 25a, 25b to a power source 40. A balance detector 60 is also provided on the bridging connection 28 which forms the bridge connecting between both phase legs 20a, 20b. The balance detector 60 is configured to measure, for example, the phase-phase voltage across the bridge circuit. Other types of zero detection are also possible.

When all the power switches in the bridge arrangement are healthy they will have a similar voltage drop. The bridge will therefore be balanced and the line-line voltage measured by the balance detector 60 will be close to zero. When one device starts to degrade, however, its voltage drop will change in respect to healthy ones. For example, some switches would have negative temperature coefficients. As a consequence, the bridge will become unbalanced and the line-line voltage will grow.

FIG. 3 shows another, alternative configuration of a new type of power converter as described herein.

As can be seen in FIG. 3, this example is very similar to the example shown in FIG. 2, except the balance detector 60 is no longer positioned on the bridging connection 28 of the bridge circuit, but instead is connected to both phase legs 20a, 20b via the top side connection 25a and the low side connection 25b. The power supply 40 is then provided on the bridging connection 28. This device works in the same manner as the example shown in FIG. 2.

In order to place the power switches 50 into the bridge, it is necessary to turn on all of the controlled switches. Typically, for a voltage source inverter such as a DC-AC power bi-directional power converter, this presents a dangerous shoot-through condition and can cause the controlled switches to fail due to thermal over-stress.

A power-down sequence for supplying power to the power converter during the bridge measurement is now described. Firstly, a main power source 80, shown in FIG. 4, is removed from the power switches 50. A secondary low power source 40, such as a current limited or current source, is then connected to the power switches 50 as shown in FIGS. 2 and 3. All of the controlled switches which are required to form the bridge circuit are then turned on. For the low power source 40, the existing pre-charge circuitry of the power converter 10 can be used (parallel pre-charge or serial pre-charge). Alternatively, the low power source 40 may be provided using motor winding to provide a current source.

This power-down sequence allows the controlled switches to be turned on without running the risk of shoot-through. The power-down sequence may proceed a period of normal operation of the power converter. The power-down sequence may also proceed the heating of the power switches 50.

One of the possible measurement sequences for performing the voltage measurement is now described. After the end of a period of operation of the power converter 10, the above described power-down sequence may be performed, and once the power converters are in the bridge circuit arrangement (FIG. 2, FIG. 3 or FIG. 4), the voltage measurement across the bridge circuit may be performed. The voltage measurement may be performed by a balance detector 60, or other suitable device. Alternatively, the existing DC link voltage measurements may be used to detect the balance across the bridge. The measuring step can further comprise comparing the balance of the bridge with a reference or historical data about the bridge balance. A change in the bridge balance above a threshold can indicate degradation in health of the power converter.

It is advantageous to perform the power-down sequence and measurement at the end of the period of operation of the power converter because the power semiconductor devices will have been exercised and any differences in thermal conductivity due to thermal cycling fatigue will be maximised. The temperature difference in the devices provides a larger signal with which to measure in the bridge arrangement.

A method for tracking the output characteristic of the power switches 50 is now described. The output characteristic, for example the voltage measurement output by the balance detector 60, can be completed periodically after each operation cycle at the end of the power-down sequence. A controller function can then perform parameter tracking measurements over operation cycles. If a trend of increasing voltages is noted over a number of operation cycles, this indicates that a controlled switch is wearing out through thermal fatigue and may fail in the near future.

The controller function can then warn the operator or wider controlling systems that the power converter needs to be changed prior to failure. This enables a preventative maintenance action to be completed and reduces the chance of the loss of availability of the power converter.

The advantage of detecting the health of the power switches 50 as described herein is that measuring the line-line voltage using a bridge circuit arrangement provides increased sensitivity when compared with measuring the voltage of each device separately. In addition, due to the balanced nature of the measurement, the measurement is less dependent on the ambient temperature compared to other types of measurement. Furthermore, only two voltage measurements are needed to detect the health of all power switches in a 3-phase, 6 switch inverter, rather than six voltage measurements if the voltage across each power switch was to be measured. A classical method of measuring the voltage would be to measure the voltage across the switches separately, or to use other temperature sensitive switch parameters such as a gate threshold voltage, for example.

The advantages of the above described devices and methods are that they allow for the health of the power switches 50 to be tracked over a number of operation cycles. If the device health is found to be degraded then a maintenance activity can be scheduled to change the power converter prior to complete failure. The performance of the measurement at the end of an operation cycle allows the maximum voltage difference to be measured due to maximum thermal differences between devices.

The lower power source 40 for the bridge arrangement can be provided by the pre-charge circuit which is typically present in a power converter circuit. This low power source limits current flowing through the switches and prevents the shoot-through damage in the controlled switches during the voltage measurement.

As well as in bi-directional power converters, the bridge circuit configuration can be applied to other types of converters that comprise components in a multilevel structure (e.g. a current source inverter or a Z-source inverter). The bridge circuit arrangement dramatically reduces the number of required measurements.

The invention claimed is:

1. An AC-DC power converter comprising a bridge circuit comprising:
   a first phase leg comprising first and second power switches connected to each other in series,
   a second phase leg comprising third and fourth power switches connected to each other in series,
   wherein the first phase leg and the second phase leg are connected to the each other via a bridging connection to form the bridge circuit;
   said converter further comprising:
   a power source that provides power to said bridge circuit, and
   means for measuring an output voltage of said bridge circuit;
   wherein said means for measuring an output voltage is configured to measure a first voltage on said first phase leg and a second voltage on said second phase leg and said converter is further configured to detect a change or imbalance between said first voltage and said second voltage, said imbalance indicating a degradation of the health of the power converter.

2. The AC-DC power converter of claim 1, wherein said means for measuring said output voltage comprises a balance detector positioned on said bridging connection.

3. The AC-DC power converter of claim 1, wherein said means for measuring said output voltage comprises a balance detector connected via a top-side connection and a low-side connection to said first and second phase legs.

4. The AC-DC power converter of claim 1, wherein the power source comprises a pre-charge circuitry of the power converter.

5. A method for monitoring the health of an AC-DC power converter, said method comprising:
   providing a bridge circuit by forming a first phase leg by connecting first and second power switches to each other in series and forming a second phase leg by connecting third and fourth power switches to each other in series and connecting the first phase leg and the second phase leg to each other via a bridging connection to form said bridge circuit; and
   providing power to said bridge circuit, and
   measuring a first output voltage of said first phase leg and measuring a second output voltage of said second phase leg, wherein a change or imbalance between said first voltage and said second voltage indicates a degradation in the health of the power converter.

6. The method of claim 5, wherein said measuring step comprises comparing the balance of the bridge with reference or historical data about the bridge balance and wherein a change in the bridge balance above a threshold indicates said degradation in health of said power converter.

7. The method of claim 5, wherein said step of providing power comprises providing said power using a pre-charge circuitry of the power converter.

8. The method of claim 5, wherein said step of providing power comprises using motor windings to provide a current source.

9. The method of claim 8, wherein existing DC link voltage measurements are used to detect the balance across the bridge circuit.

10. The method of claim 5, wherein said step of measuring said voltage output is performed as part of a power down sequence, said power down sequence comprising the following steps:
    removing a main power source from the power switches and providing said power as a secondary power source to the switches.

11. The method of claim 10, wherein said power is provided by said secondary power source having its current limited.

12. The method of any of claim 10, wherein prior to removing the main power source from the power switches, the power down sequence further comprises:
heating the power switches subject to testing.

13. The method of claim 5, further comprising:
providing a warning if a degradation in health of said power converter has been detected.

* * * * *